(12) United States Patent
Siemiantkowski

(10) Patent No.: US 7,431,331 B2
(45) Date of Patent: Oct. 7, 2008

(54) WHIPLASH PROTECTION STRUCTURE

(75) Inventor: Phillip Siemiantkowski, Fenton, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 340 days.

(21) Appl. No.: 11/327,429

(22) Filed: Jan. 9, 2006

(65) Prior Publication Data

US 2007/0158933 A1    Jul. 12, 2007

(51) Int. Cl.
*B60N 2/42* (2006.01)
(52) U.S. Cl. .................... 280/730.1; 280/728.2
(58) Field of Classification Search .......... 280/730.1, 280/728.2; 297/216.1, 216.12, 216.13, 216.14
See application file for complete search history.

(56) References Cited

U.S. PATENT DOCUMENTS

| | | | |
|---|---|---|---|
| 3,655,217 A * | 4/1972 | Johnson ...................... 280/737 |
| 3,703,313 A * | 11/1972 | Schiesterl et al. ........... 297/391 |
| 5,738,407 A * | 4/1998 | Locke ................... 297/216.12 |
| 5,782,529 A * | 7/1998 | Miller et al. ........... 297/216.13 |
| 5,913,536 A * | 6/1999 | Brown ...................... 280/730.2 |
| 6,030,036 A * | 2/2000 | Fohl ...................... 297/216.14 |
| 6,095,550 A * | 8/2000 | O'Loughlin et al. ..... 280/730.1 |
| 6,196,576 B1 * | 3/2001 | Sutherland et al. ....... 280/730.1 |
| 6,199,900 B1 | 3/2001 | Zeigler |
| 6,572,137 B2 | 6/2003 | Bossecher et al. |
| 6,695,342 B2 * | 2/2004 | Tanase et al. ............ 280/730.2 |
| 2004/0075252 A1 | 4/2004 | Pan |

FOREIGN PATENT DOCUMENTS

EP        1164062 A1    12/2001

\* cited by examiner

*Primary Examiner*—Eric Culbreth
*Assistant Examiner*—Nicole Verley
(74) *Attorney, Agent, or Firm*—Global IP Counselors, LLP

(57) ABSTRACT

A whiplash protection structure for a vehicle includes a vehicle seat back and an airbag. The vehicle seat back is configured to be mounted in a vehicle in a substantially upright position to support an occupant's back. The air bag is arranged in the seat back to deploy from an uppermost end along an upward deployment path to form a head restraint above the uppermost end of the seat back when inflated upwardly. The seat back can be absent a headrest that projects upwardly. Alternatively, the seat back can include a headrest that projects upwardly with the airbag arranged in the headrest.

10 Claims, 11 Drawing Sheets

WHIPLASH PROTECTION STRUCTURE

BACKGROUND OF THE INVENTION

1. Field of the Invention

The present invention generally relates to a whiplash protection structure. More specifically, the present invention relates to a whiplash protection structure, which utilizes a seat mounted airbag that deploys in order to protect a vehicle occupant's head from excessive whiplash.

2. Background Information

Many conventional automobile seat backs are designed to protect the head of a seated passenger in the event of a rear-end collision. Most commonly, a seat is provided with a heat rest to prevent a vehicle occupant's head from excessive whiplash. These head rests are often vertically adjustable. Some head rests are active head rests that move forward towards the vehicle occupant's head in the event of a rear-end collision. In an active head rest, the seat back bears the dynamic load that acts on a seated passenger due to inertia when the vehicle is subjected to a rear-end collision. The movement of passenger into the seat back causes a member in the seat back to be displaced which in turn causes a headrest support arm and the headrest unit to move toward the front of the vehicle. As a result, a large rearward movement of the seated passenger's head can be prevented.

In another example, when a rear-end collision occurs, a sensor built into the seat back is depressed strongly by the inertia force of the seated passenger and an airbag is deployed in a forward direction from inside the headrest unit. As a result, even if space exists between the neck area of the seated passenger and the headrest unit, the passenger's head can be prevented from moving rearward. An example of this type of arrangement is disclosed in U.S. Pat. No. 6,572,137.

In view of the above, it will be apparent to those skilled in the art from this disclosure that there exists a need for an improved whiplash protection structure. This invention addresses this need in the art as well as other needs, which will become apparent to those skilled in the art from this disclosure.

SUMMARY OF THE INVENTION

It has been discovered that active head rests work very well if used properly. However, if the passenger does not properly adjust the head rest, then the head rest might not work as well as a properly adjusted head rest. Moreover, with these active head rests, the headrest unit does not begin moving forward until the rearward displacement of the passenger is relatively large. Consequently, the head rest unit cannot always be moved sufficiently forward during the period immediately after the collision (when the amount of displacement of the passenger is still relatively small). In other words, immediate response is not always possible in this type of arrangement, and thus, the head restraining action or movement of the headrest may occur later than desired (i.e. head restraining effect may be reduced), especially if the passenger was in a forward-leaning posture at the time of the collision.

In general, some complaints by users about head rests include that they restrict visibility and they are some times uncomfortable. Also these head rests can be relatively cumbersome with certain seating arrangements. For example, these prior head rests can cause interference issues for seats that may also be used in different configurations (i.e. cargo modes, ingress and egress modes, etc.).

It has also been discovered that with prior head restraints for reducing whiplash, performance is not always optimal for all passengers having varying heights. In particular, the position of the headrest often needs to be adjusted according to the passenger's height in order to achieve optimum performance. This can be inconvenient. Moreover, the positioning of the headrests for the various passengers is not always aesthetically pleasing and can result in comfort and visibility issues (i.e. because the headrests are typically relatively large and uncomfortable), In view of the shortcomings with prior head restraints for reducing whiplash, the present invention seeks to provide a whiplash protection structure that quickly and reliably restrains a seated passenger's head during a rear-end collision to substantially reduce and/or eliminate whiplash in such a collision. Moreover, the present invention seeks to provide a whiplash protection structure that is aesthetically pleasing, and does not result in comfort and/or visibility issues for the driver and/or passengers. Furthermore, the present invention seeks to provide a whiplash protection structure that is relatively simple. In other words, the present invention seeks to provide a whiplash protection structure that is not only functional, but does not compromise aesthetics, comfort and/or visibility.

The foregoing objects can basically be attained by providing a whiplash protection structure for a vehicle, which comprises a vehicle seat back and an airbag. The vehicle seat back is configured to be mounted in a vehicle in a substantially upright position to support an occupant's back. The air bag is arranged in the seat back to deploy from an uppermost end along an upward deployment path to form a head restraint above the uppermost end of the seat back when inflated upwardly.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
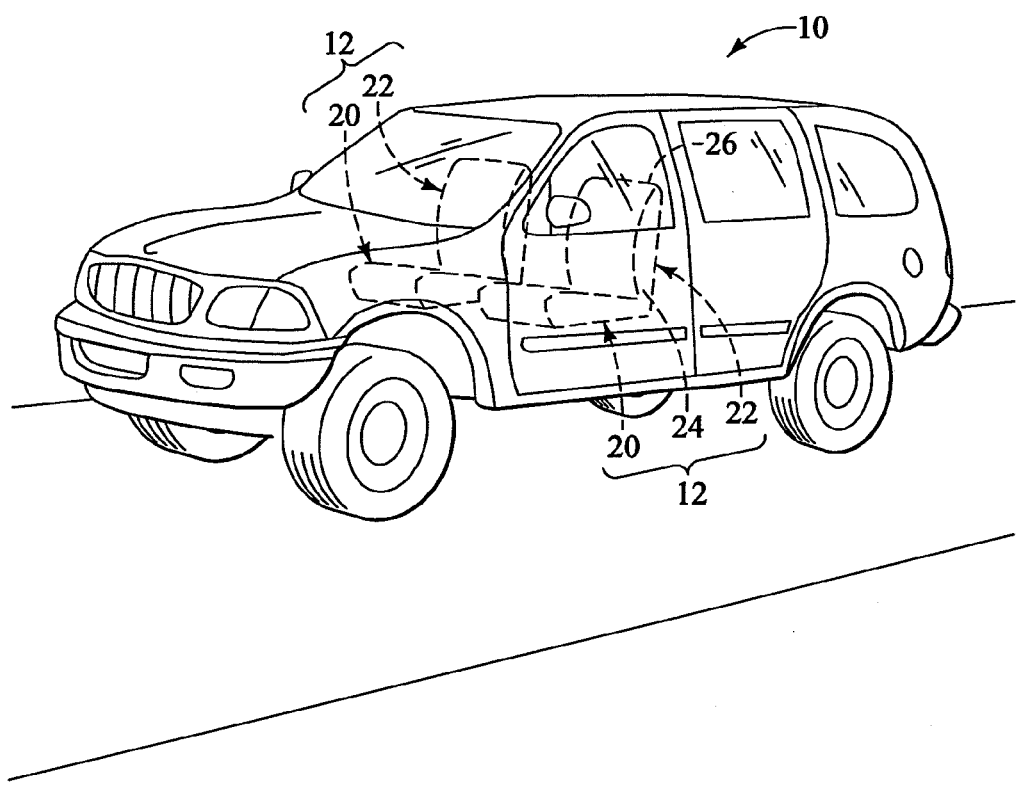
FIG. 1 is a front perspective view of an automotive vehicle equipped with a whiplash protection structure in accordance with a first embodiment of the present invention.
Figure 2:
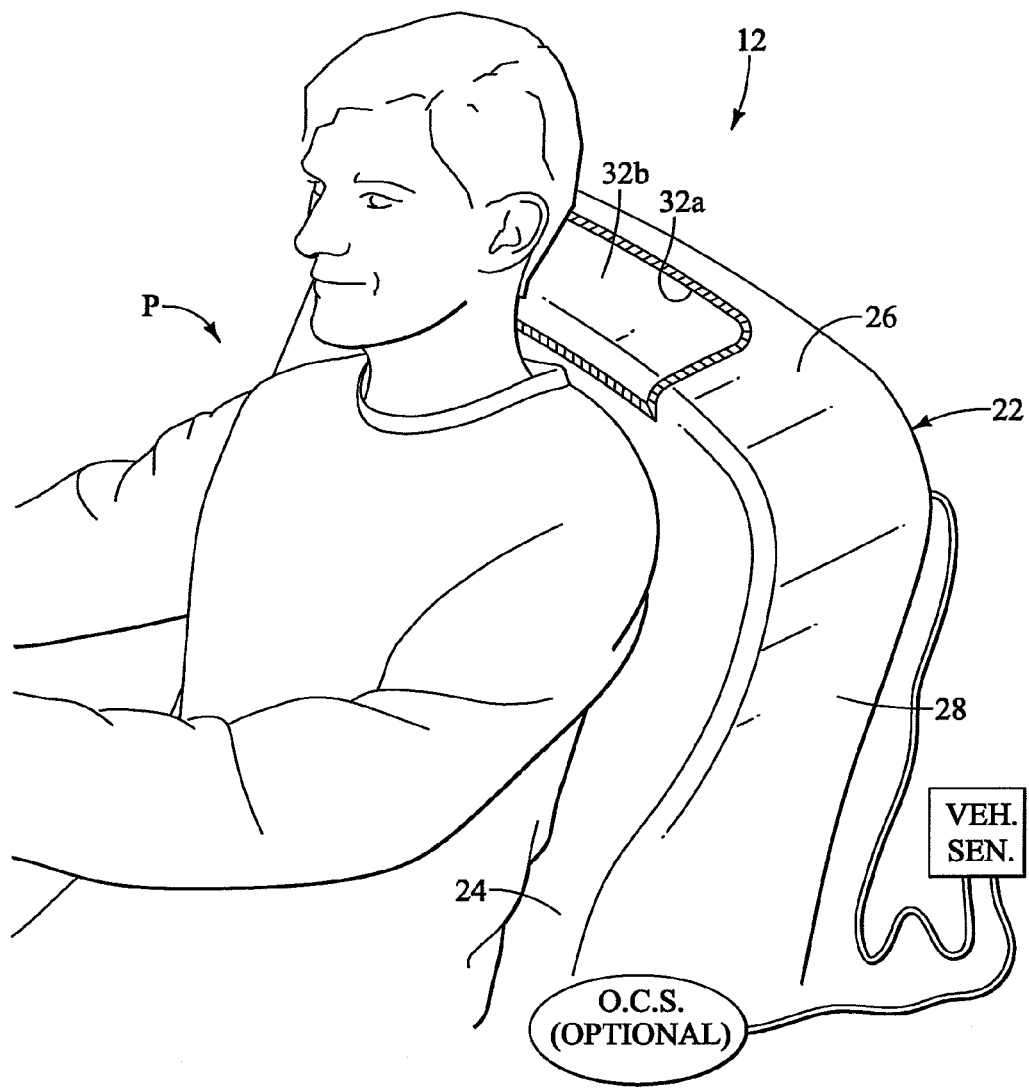
FIG. 2 is a front perspective view of the whiplash protection structure of the vehicle illustrated in FIG. 1, prior to deployment of the airbag.
Figure 3:
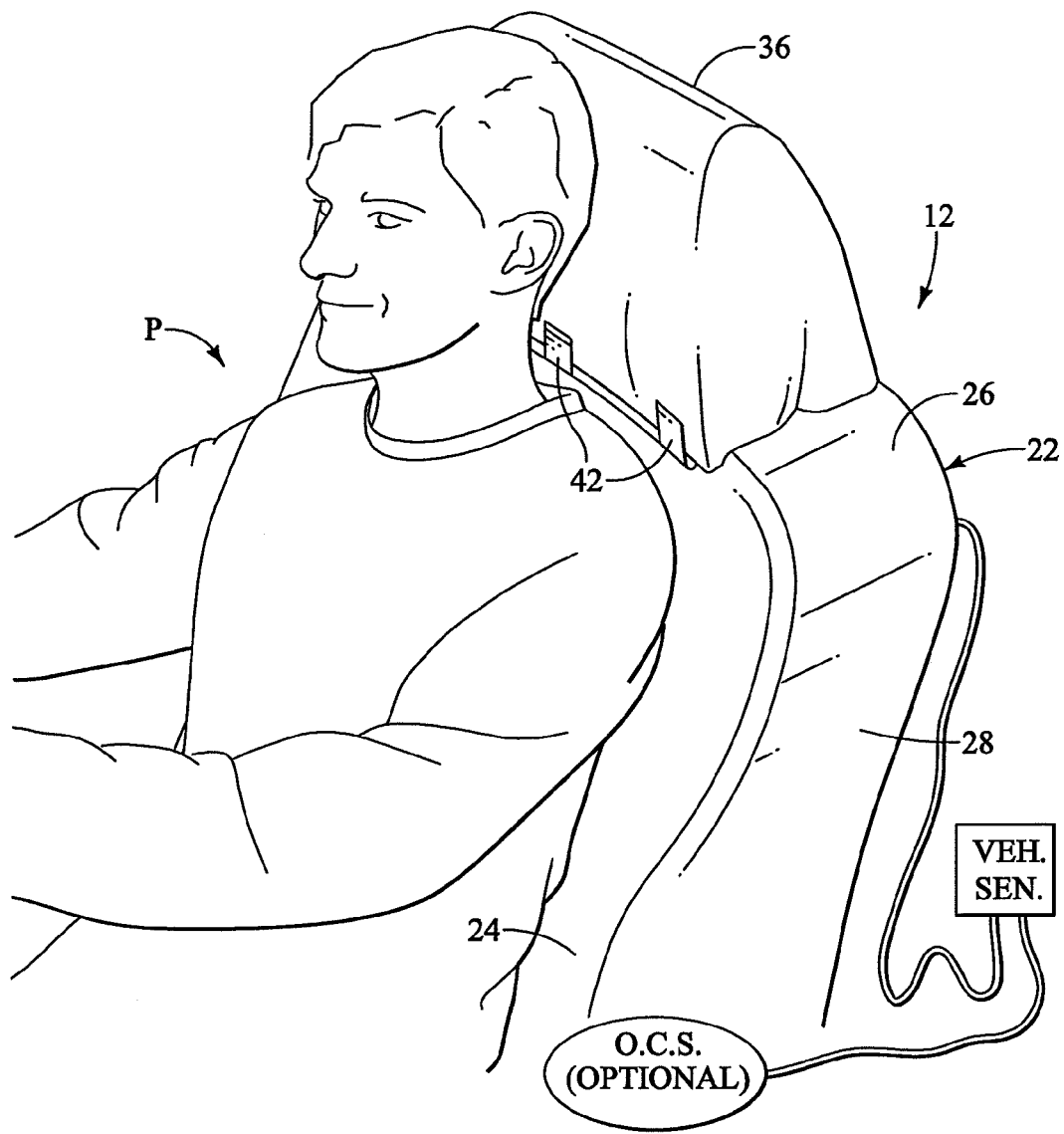
FIG. 3 is a front perspective view of the whiplash protection structure illustrated in FIG. 2, after deployment of the airbag.

Referring initially to FIGS. 1-3, an automotive vehicle 10 is illustrated, which includes at least a pair of front seats 12 with each of the front seats 12 having a whiplash protection structure 14 in accordance with a first embodiment of the present invention. Of course, the automotive vehicle 10 also preferably has a rear bench seat (not shown) having three of the whiplash protection structure 14. Basically, the whiplash protection structure 14 utilizes a head restraint air bag 16 to restrain the head of a passenger P in the event of a rear end collision to reduce whiplash to the passenger P during such a collision. In this embodiment, the seat 12 is absent a traditional cushioned headrest (either adjustable or fixed) that projects upwardly from the seat 12, as seen in FIGS. 1 and 2. Rather, in this embodiment, the head restraint airbag 16 alone is utilized to protect the passenger P from whiplash when the head restraint airbag 16 is deployed.

The parts of the vehicle 10 and the seats 12 are conventional, except for the whiplash protection structure 14. Accordingly, the vehicle 10 and the seats 12 will not be discussed and/or illustrated herein except as needed to make and use the whiplash protection structure 14. Moreover, it will be apparent to those skilled in the art from this disclosure that both of the seats 12 (shown in FIG. 1) and the rear bench seat are preferably provided with the whiplash protection structure 14 of the present invention, even though only one of the seats 12 will be discussed and illustrated with the whiplash protection structure 14.

Referring now to FIGS. 1-5, the seat 12 basically includes a seat bottom 20 and a seat back 22 with the head restraint airbag 16 mounted therein. The seat bottom 20 is either fixedly attached or adjustably attached to the vehicle 10 (i.e. to the frame and/or body of the vehicle 10) in a conventional manner. The seat back 22 is preferably attached to the seat bottom 20 in a pivotally adjustable manner such that the inclination of the seat back 22 can be adjusted according to passenger preferences. Of course, the seat back 22 could be fixedly attached to the seat bottom 20 if needed and/or desired. The upper end of the seat back 22 forms a housing for the head restraint airbag 16 as explained below. Thus, the head restraint airbag 16 and the upper end of the seat back 22 form two of the main parts of the whiplash protection structure 14 in accordance with the present invention, as explained in more detail below.

The seat back 22 basically includes a (lowermost) attachment end 24, a (uppermost) free end 26 and a back support portion 28 extending between the lower and upper ends 24 and 26. The attachment end 24 is preferably adjustably attached to the seat bottom 20 such that the inclination of the seat back 22 can be adjusted according to passenger preferences. The seat back 22 is preferably arranged in a substantially upright position during normal driving so that the back support portion 28 support the back of the passenger P when the passenger P is in a normal seated position. Preferably, the seat back 22 is sized and configured to extend upwardly to height approximately equal to the height of typical vehicle seats with their headrests (either fixed or adjustable) removed.

The seat back 22 is constructed in a substantially conventional manner using a rigid back frame structure 30, cushioning structure/materials (not shown) and exterior trim or upholstery 32 (e.g. fabric or leather). The cushioning structure/materials (not shown) such as flexible spring metal frame and foam are supported on the back frame structure 30 in a conventional manner. The exterior trim 32 is wrapped over the cushioning structure/materials (not shown) in a conventional manner. The back frame structure is constructed of a lightweight, rigid material such as a metallic material that is well known in the automotive art.

The exterior trim 32 has an airbag opening 32a formed therein with an opening cover 32b normally arranged in the airbag opening 32a to conceal the airbag opening 32a. The opening cover 32b is attached around its outer periphery to the inner periphery of the airbag opening 32a using a bursting seam (e.g. an area of reduced strength or an actual seam with breakable stitching) in a conventional manner. The airbag opening 32a is sized to permit the head restraint air bag 16 to be deployed upwardly therethrough, as best understood from FIGS. 2 and 3. The airbag opening 32a is arranged at the (uppermost) free end 26 of the seat back 22.

Referring to FIGS. 1-7, the head restraint air bag 16 basically includes an airbag bracket 34, an airbag inflator 35, an inflatable airbag 36, an airbag support member 37 and a movement control structure 38 coupled between the airbag bracket 34 and the airbag 36. The airbag bracket 34 is fixedly attached to the back frame structure 30 of the seat back 22. The inflatable airbag 36 is normally arranged or housed within the airbag bracket 34. The airbag support member 37 and the movement control structure 38 are arranged and configured to limit movement of the inflated airbag 36 when inflated. The airbag bracket 34 is preferably constructed of a lightweight, rigid material such as a metallic material that is well known in the automotive art.

The airbag 36 is filled with an explosive gas from the inflator 35, which can rapidly expand the airbag 36 in the event of a rear end collision in a conventional manner. The airbag inflator 35 is preferably a conventional member that is well known in the automotive art. Thus, the construction of the airbag inflator 35 will not be discussed or illustrated in detail herein.

Figure 6:
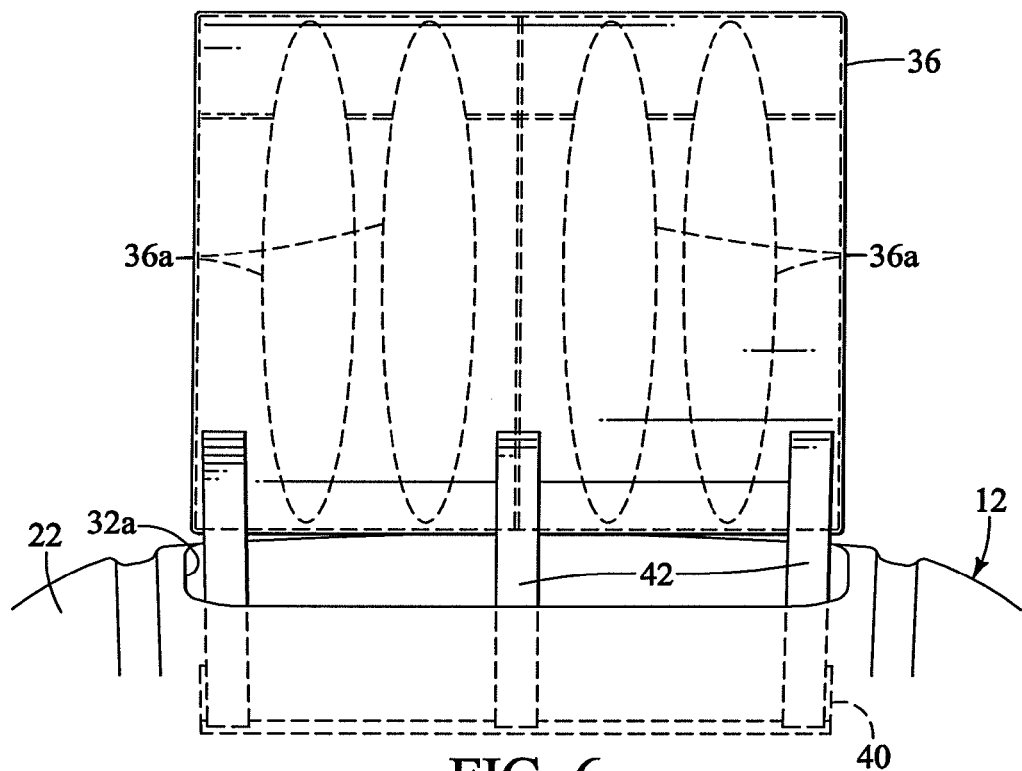
FIG. 6 is a schematic front elevational view of the deployed airbag of the whiplash protection structure illustrated in FIGS. 2-5, with a plurality of vertical airbag chambers shown in hidden lines for the purpose of illustration and connecting straps illustrated as an example for part of the control structure.
Figure 7:
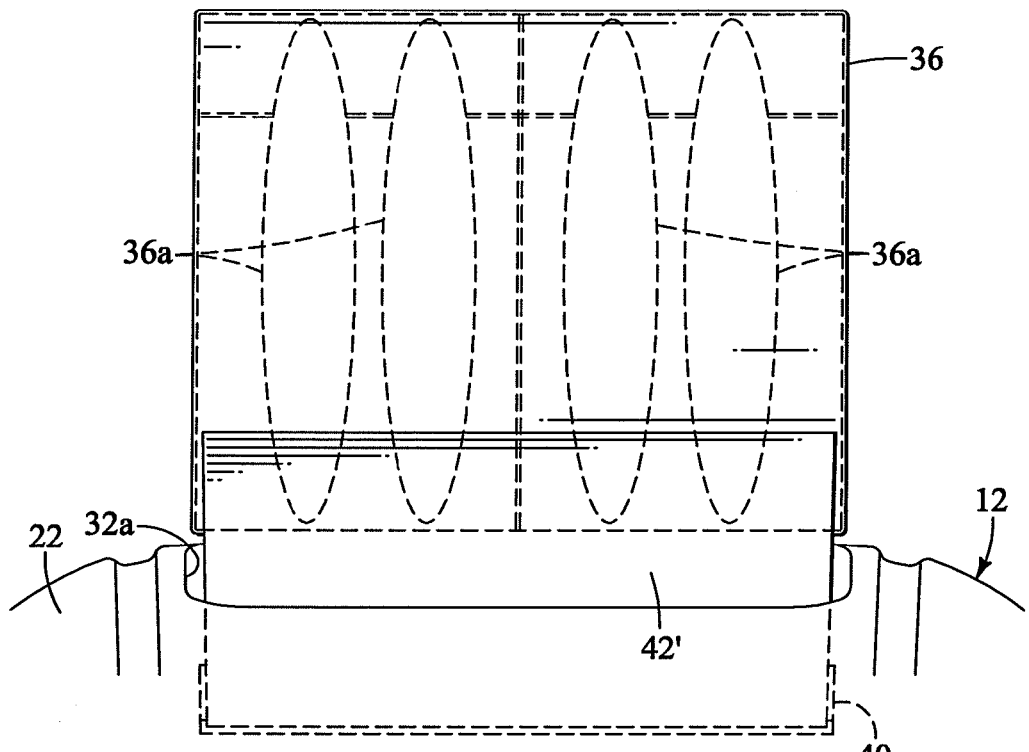
FIG. 7 is a schematic front elevational view of the deployed airbag of the whiplash protection structure illustrated in FIGS. 2-5, with a plurality of vertical airbag chambers shown in hidden lines for the purpose of illustration and webbing illustrated as an example for part of the control structure.

As mentioned above, the inflatable airbag 36 is normally arranged in the housing attached to the air bag bracket 34 within the upper end of the seat back 22. The phrases "normally arranged" or "normally use position" as used herein refers to the whiplash protection structure 14 being used during normal driving conditions of the vehicle 10. In other words, the airbag 36 is arranged in the housing attached to the air bag bracket 34 within the upper end of the seat back 22, except for when the airbag 36 is deployed during a rear end collision or the like. When the vehicle 10 is involved in a rear end collision or the like, the airbag 36 is deployed/inflated to project upwardly through the airbag opening 32a. The airbag 36 preferably includes a plurality of vertical airbag chambers 36a arranged in a laterally spaced side-by side arrangement in a non-overlapping manner, as seen in FIGS. 6-7. The airbag chambers 36a provide additional rigidity to the airbag 36 when inflated.

The airbag support member 37 and the movement control structure 38 are airbag anti-rotation structures that are configured and arranged to limit rearward movement (i.e. clockwise rotation as viewed in FIG. 5) of the airbag 36 when inflated. The airbag support member 37 engages and supports bottom rear end of the airbag 36 to limit rearward movement (i.e. clockwise rotation as viewed in FIG. 5) of the airbag 36 when inflated. The movement control structure 38 basically includes a rigid support member 40 and a pair of connecting members 42. The support member 40 is fixedly attached to the back frame structure 30 and/or the airbag bracket 34. The connecting members 42 are attached to both the support member 40 and the airbag 36 to reduce rearward movement (e.g. clockwise rotation) of the airbag 36 when the airbag 36 is contacted by the rearwardly moving head of the passenger P as viewed in FIG. 5.

Figure 4:
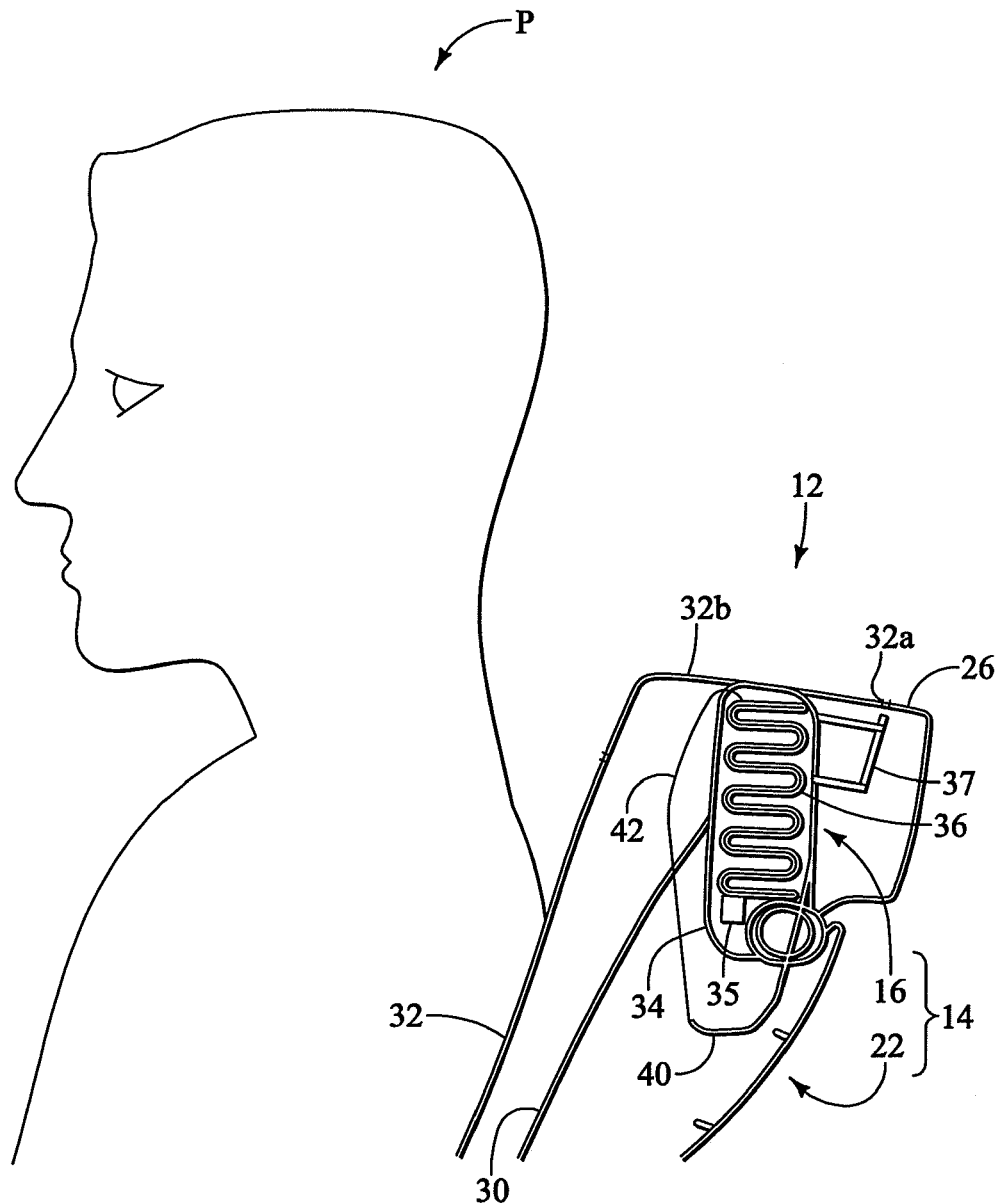
FIG. 4 is a schematic side elevational view of the whiplash protection structure illustrated in FIG. 2, i.e. prior to deployment of the airbag.
Figure 5:
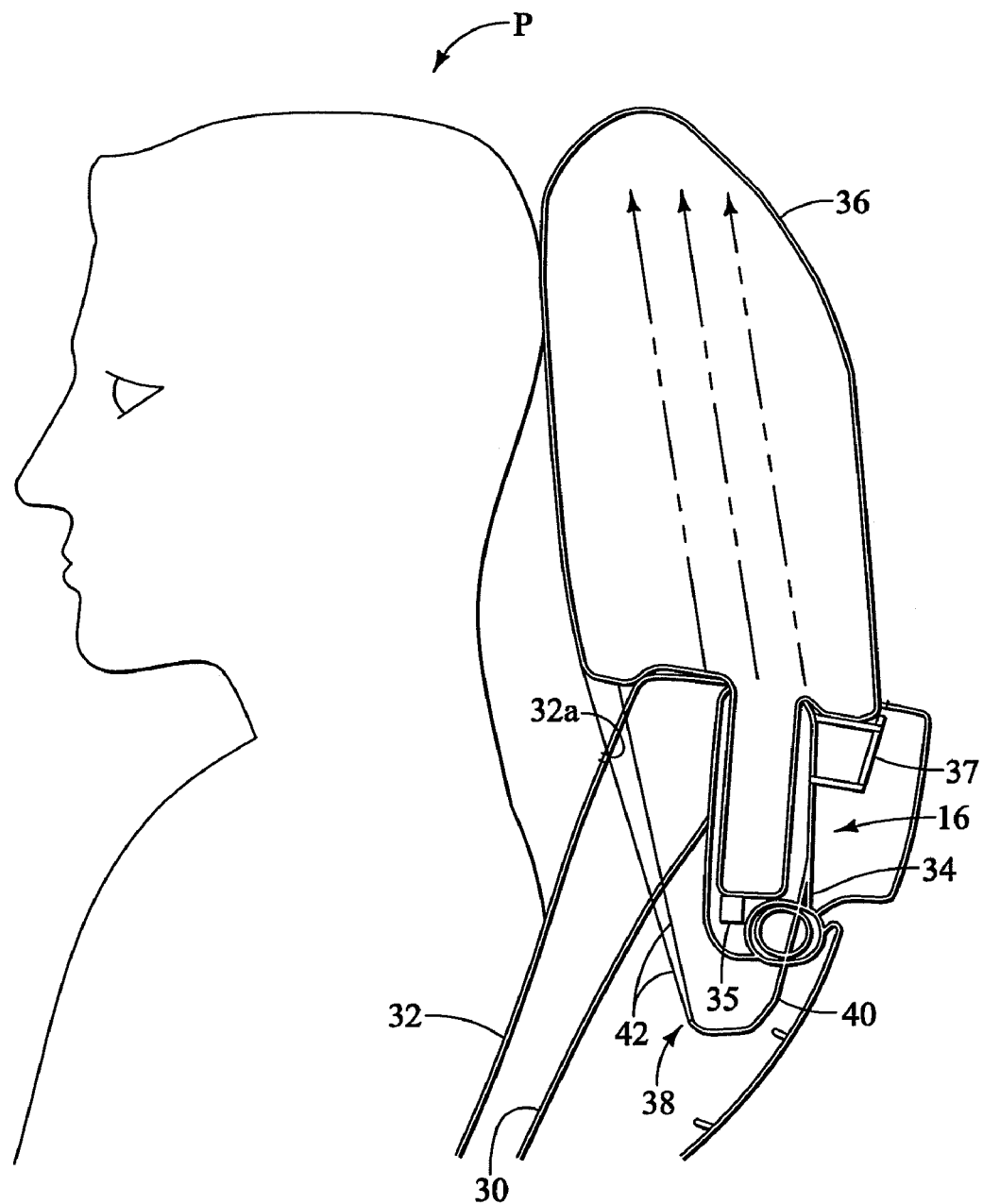
FIG. 5 is a schematic side elevational view of the whiplash protection structure illustrated in FIG. 3, i.e. after deployment of the airbag.

The support member 40 has a substantially J-shaped configuration as seen in FIGS. 4 and 5. The support member 40 is preferably constructed of a lightweight, rigid material such as a metallic material that is well known in the automotive art. The support member 40 preferably extends laterally along the entire length of the airbag 36 as best seen in FIGS. 6 and 7. Preferably, the support member 40 is configured and arranged to attach the connecting members 42 thereto in a plurality of laterally spaced locations. However, a single connection point is possible. The support member 40 can include slot(s), hole (s) or any other conventional fastening structure for attaching the connecting members 42 thereto.

Each of the connecting members 42 is a flexible member coupled between the airbag 36 and the support member 40 to control or limit movement of the airbag 36. Each of the connecting members 42 has one end attached to the support member 40 via a conventional fastening structure, while the other end is attached to the airbag 36 by sewing, strong adhesive or the like. Preferably, the connecting members 42 include one or more straps, or webbing. In any case, the connecting member 42 is preferably inelastic in an axial direction but flexible in a lateral direction. Thus, the connecting member 42 can be rolled or folded within the airbag bracket 34 prior to deployment of the airbag 36, but can be extending during deployment to prevent movement of the airbag 36. For example, the strap or webbing of the connecting member 42 could be constructed of woven nylon similar to a seat belt. In FIG. 6, each of the connecting members 42 is formed of three laterally spaced straps. Alternatively, as seen in FIG. 7, the front side of the airbag 36 is coupled to the support member 40 by a pair of wide connecting members 42' (only one shown in FIG. 7).

Referring still to FIGS. 2 and 3, control and deployment of the whiplash protection structure 14 will now be explained in more detail. The vehicle 10 preferably includes a collision sensor VEH SEN (only diagrammatically illustrated) used to deploy the head restraint airbag 16 at the appropriate time in the event of an appropriate collision. Vehicle sensors such as the collision sensor VEH SEN are well known in the automobile art. In other words, the collision sensor VEH SEN is conventional, except that it is connected to the whiplash protection structure 14 of the present invention. Thus, the collision sensor VEH SEN will not be explained and/or illustrated in detail herein, except as needed to make and use the whiplash protection structure 14 of the present invention. The vehicle collision sensor VEH SEN is simply designed to send a signal to the whiplash protection structure 14 upon determining a condition (i.e. a rear collision event) of the vehicle 10 in which whiplash may occur in a manner similar to the way front drive and passenger airbags are deployed in a conventional manner. Optionally, a conventional seat occupancy sensor OCS (only diagrammatically illustrated) may also be provided that is coupled vehicle collision sensor VEH SEN such that the head restraint airbag 16 will only deploy when the seat 12 is occupied in a conventional manner.

The present invention is designed to such that the topmost edge of the inflated airbag 36 is at least 700 millimeters, preferably 750-800 millimeters, above the H-point of the seat that the whiplash protection structure 14 is installed. Basically, the H-point of the seat 12 is determined using a three dimensional SAE J826 (rev. Jul 95) manikin. More specifically, the topmost edge of the inflated airbag 36 is preferably at least 700 millimeters above the H-point of the seat as measured parallel to the torso reference line defined by the three dimensional SAE J826 (rev. Jul 95) manikin to a plane normal to the torso reference line passing through the top of the inflated airbag 36. Moreover, the present invention is designed such that the inflated airbag 36 preferably has a width of at least 170 millimeters (more preferably of at least 254 millimeter) at a point that is about 635 millimeters above the H-point.

Normally, head restraints are limited in width due to visibility issues for the driver. However, with the present invention, front and/or rear head restraints can be provided that obtain any desired width by using the whiplash protection structure 14 of the present invention, since the airbag 36 is normally concealed within the seat 12 during normal use. In other words, the airbag 36 can be made wider than conventional read rest without compromising visibility because the structure is normally concealed within the seat.

In addition, the present invention is designed such that the backset dimension (distance between the passenger's head and the head restraint) is less than about 55 mm with torso angle at 25 degrees, and preferably even smaller. Thus, driver visibility is maximized. However, with the present invention, passenger comfort is not compromised since the structure is normally concealed within the seat 12. In other words, with the present invention, previous issues of visibility and comfort can be eliminated because the airbag 36 is concealed during normal driving and only during deployment fills the desired dimensions. Thus, the airbag 36 can be as large as legally required or even larger without adversely affecting visibility and/or comfort. Thus, compliance with 49 C.F.R. §571 Standard No. 202 can be achieved and even exceeded without compromising visibility and/or passenger comfort by providing head restraints designed in accordance with the present invention.

Second Embodiment

Figure 8:
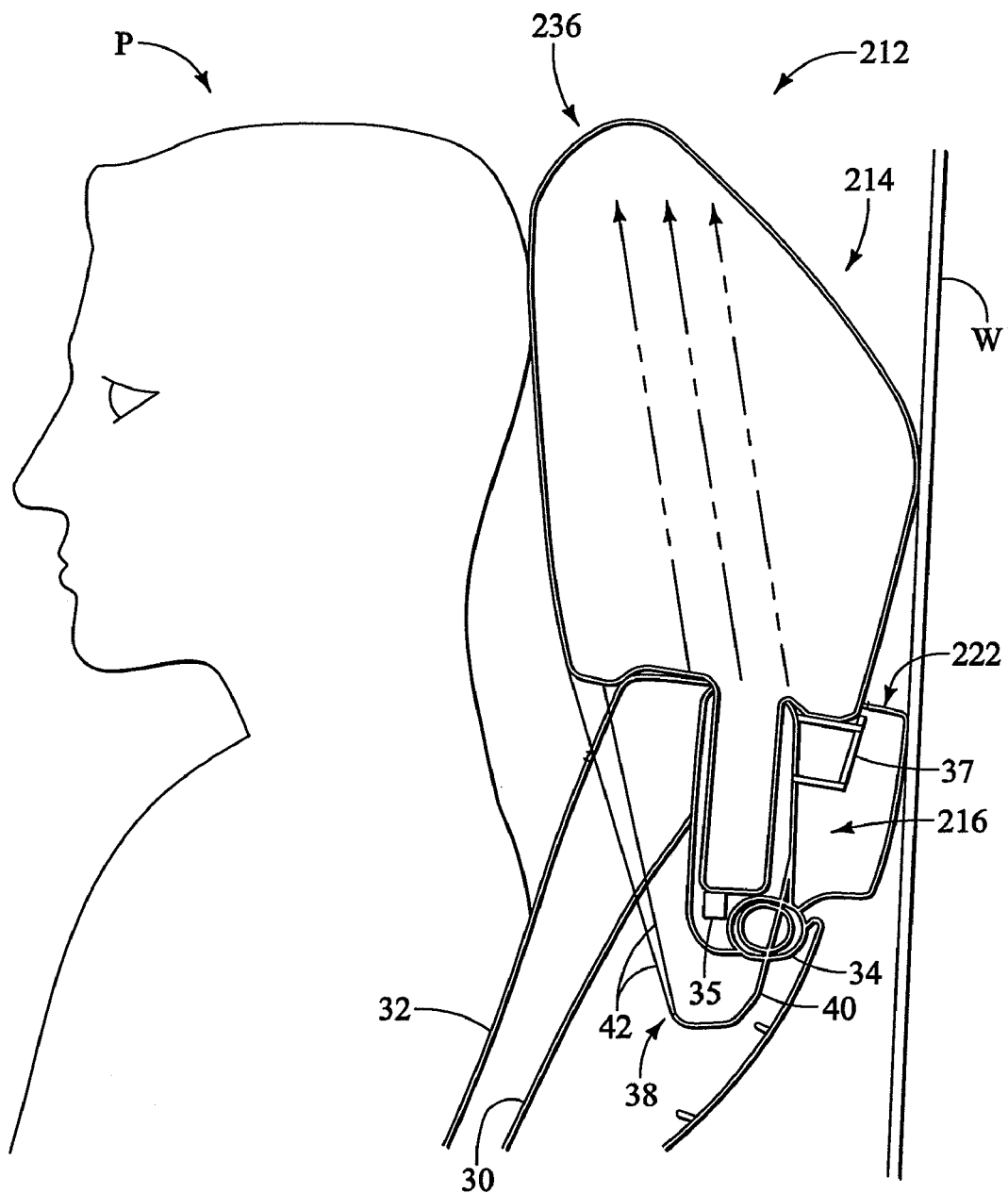
FIG. 8 is a schematic side elevational view of a modified whiplash protection structure having a modified airbag shape after deployment of the airbag in accordance with a second embodiment of the present invention.
Figure 9:
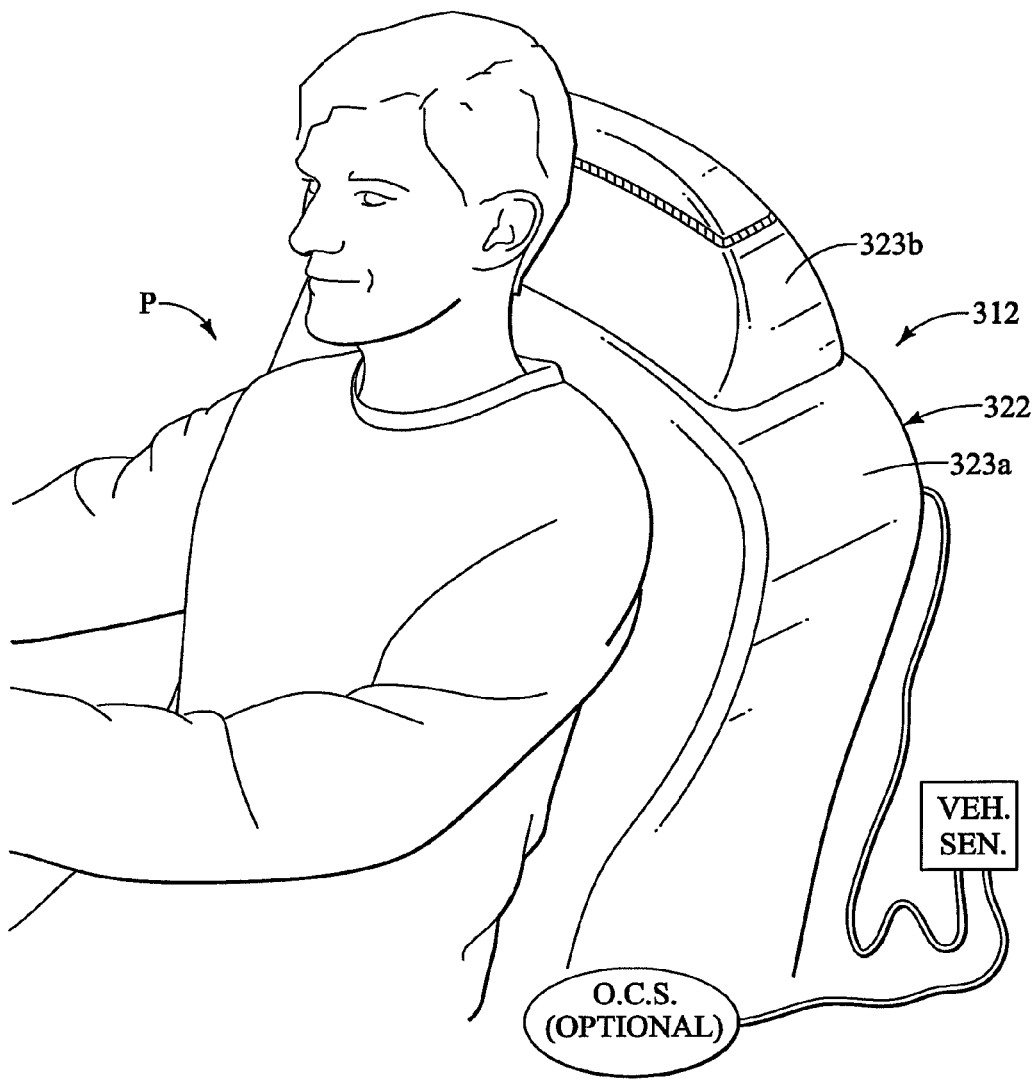
FIG. 9 is a front perspective view of a whiplash protection structure in accordance with a third embodiment of the present invention, prior to deployment of the airbag.
Figure 10:
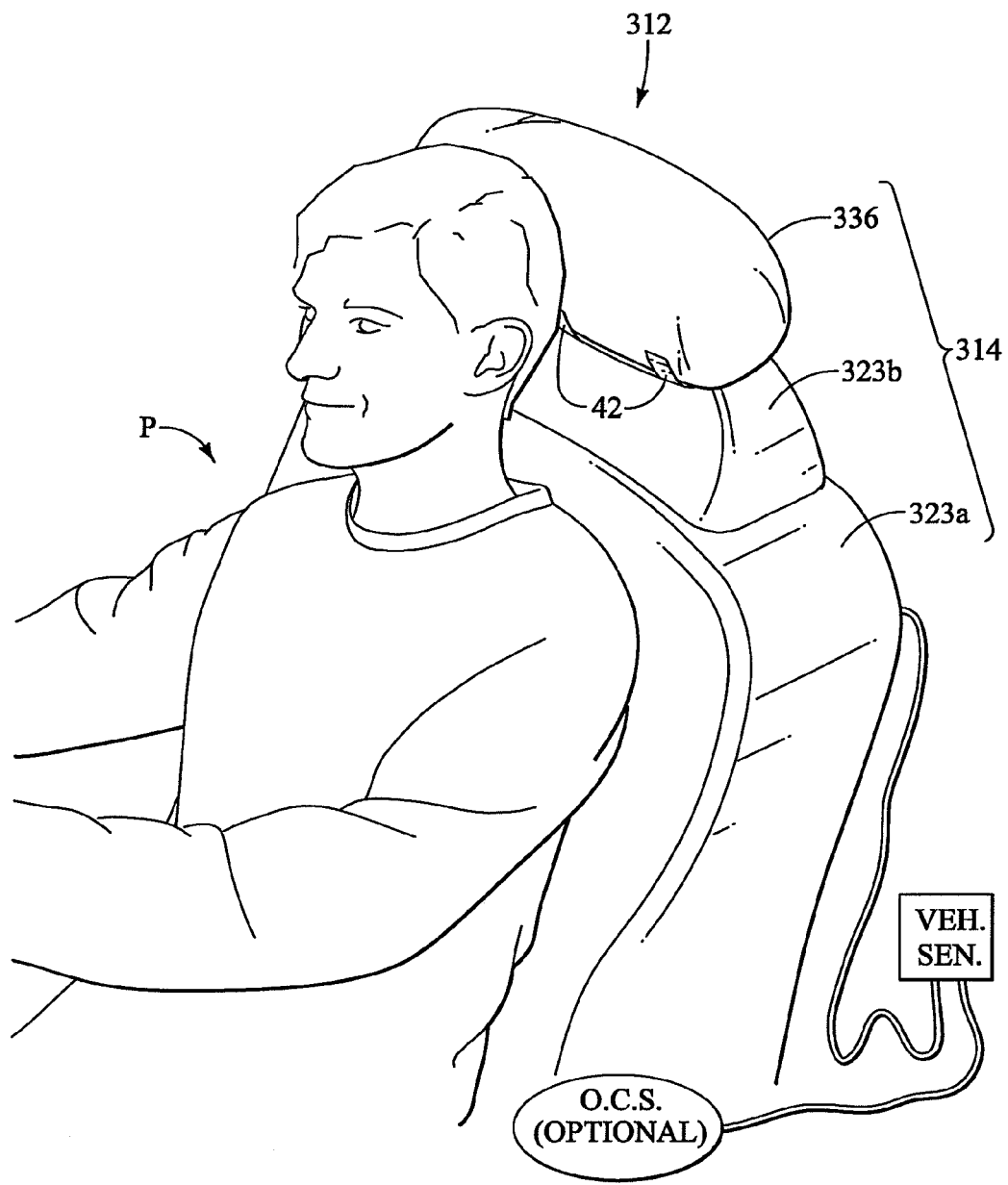
FIG. 10 is a front perspective view of the whiplash protection structure illustrated in FIG. 9, after deployment of the airbag.
Figure 11:
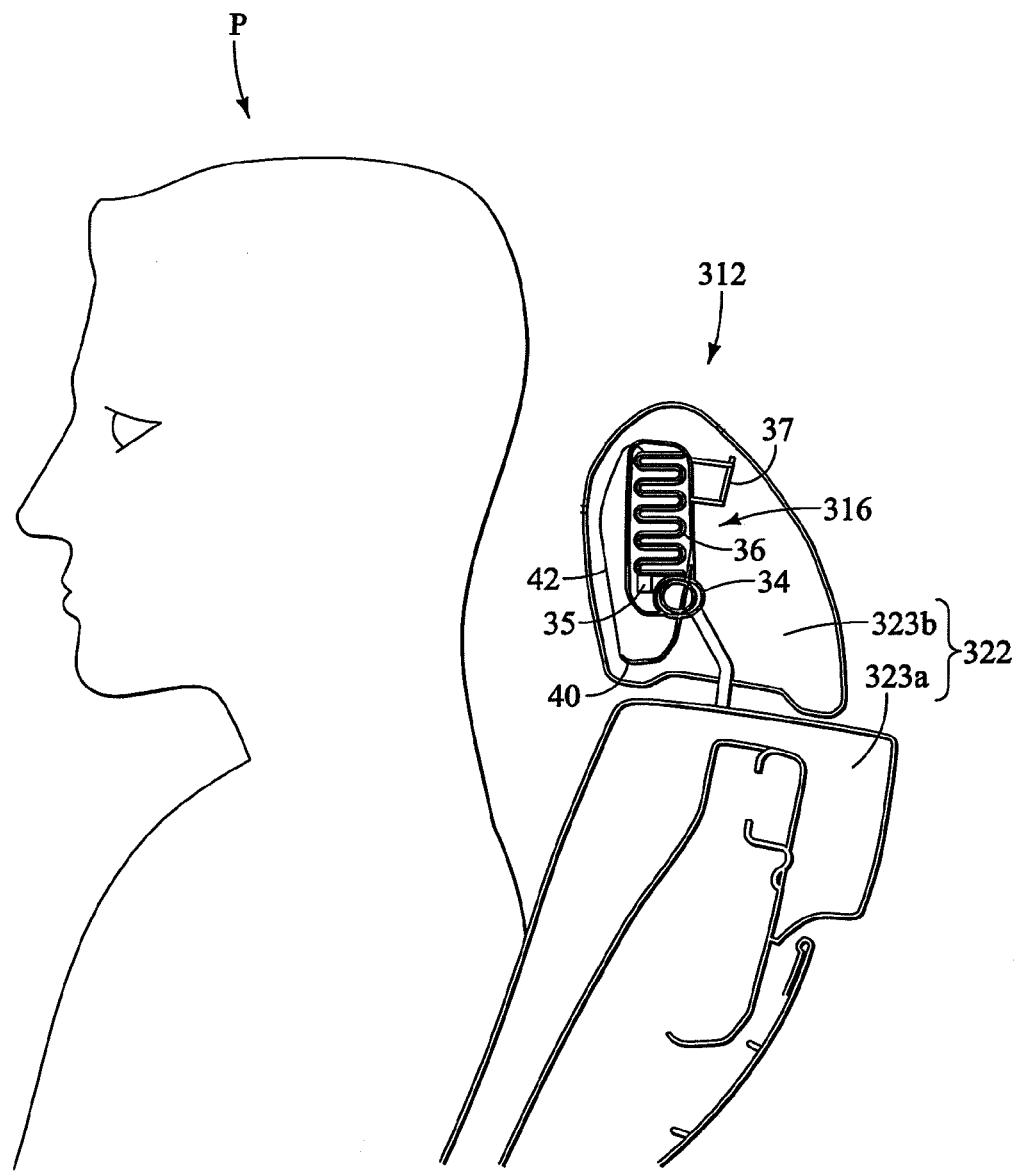
FIG. 11 is a schematic side elevational view of the whiplash protection structure illustrated in FIG. 9, i.e. prior to deployment of the airbag.
Figure 12:
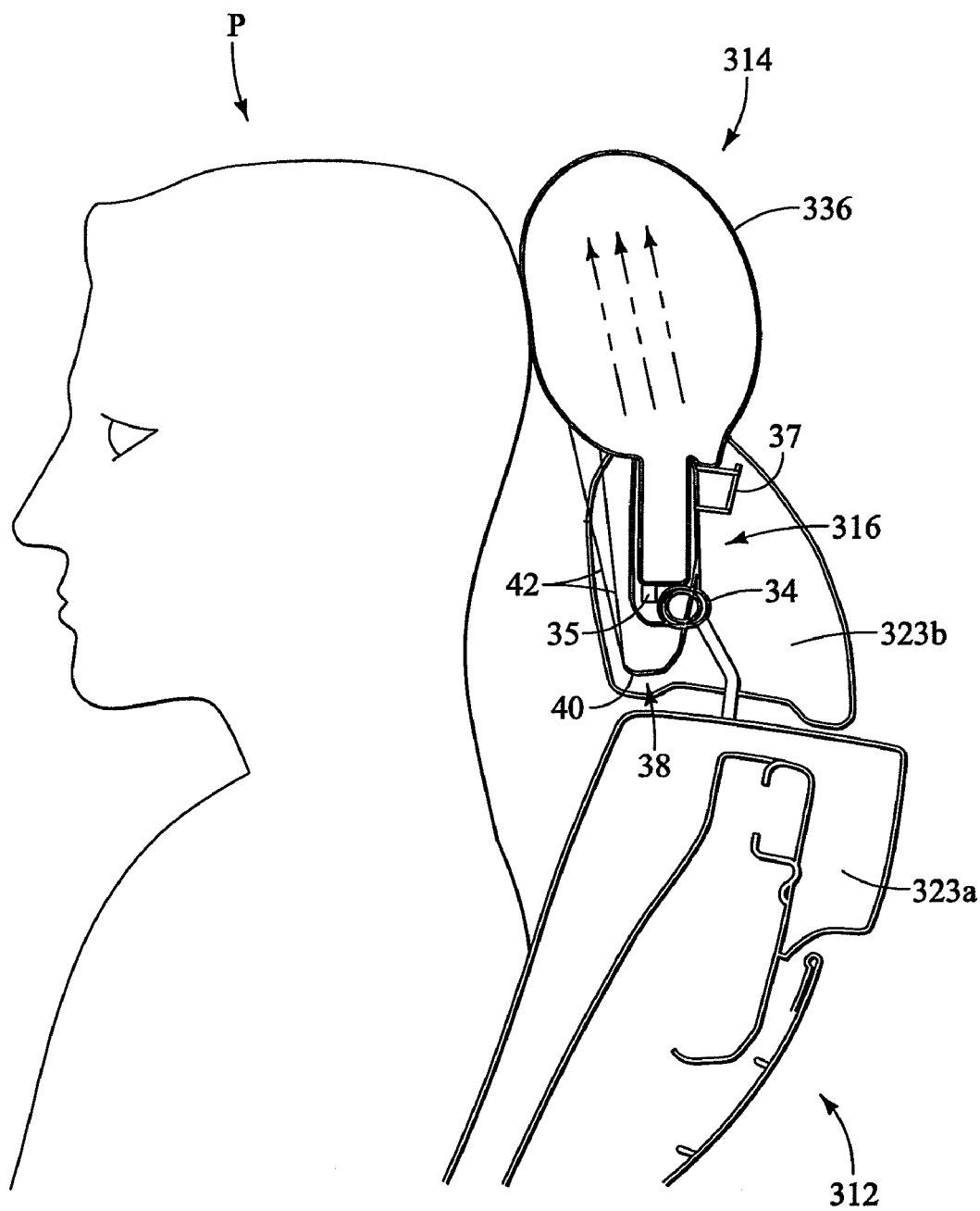
FIG. 12 is a schematic side elevational view of the whiplash protection structure illustrated in FIG. 10, i.e. after deployment of the airbag.

Referring now to FIG. 8, a modified whiplash protection structure 214 in accordance with a second embodiment will now be explained. The whiplash protection structure 214 of this second embodiment is identical to the whiplash protection structure 14 of the first embodiment, except that the whiplash protection structure 214 includes a modified head restraint airbag 216 that is designed to expand in the front to rear direction of the vehicle to contact a rear surface or wall W of the vehicle cabin. Otherwise, this embodiment is identical to the first embodiment. Accordingly, it will be apparent to those skilled in the art from this disclosure that the descriptions and illustrations of the first embodiment also apply to this second embodiment, except as explained and illustrated herein.

In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment, but are functionally identical will be given the same references numerals but with "200" added thereto (i.e. 200 series).

As seen in FIG. 8, the whiplash protection structure 214 is a schematically illustrated in side elevation, after deployment of the modified head restraint airbag 216 in a manner similar to the first embodiment of the present invention. The modified head restraint airbag 216 has a modified airbag member 236 with a modified shape such that the rear of the airbag member 236 projects in a rearward direction further than the airbag 36 of the first embodiment. The rear of the airbag member 236 is designed to potentially contact the rear surface W (e.g. a rear window or wall of a pickup truck) when inflated. In particular, when inflated, the airbag member 236 has a rear edge substantially aligned with a rear edge of a seat back 222 that normally contains the head restraint airbag 216. Thus, if the seat back 222 is substantially aligned with or touching the rear surface W, the rear edge of the inflated airbag member 236 will be substantially aligned with or touching the rear surface W. In this embodiment, the presence of the rear surface W and the rear position/shape of the inflated airbag member 236 act to further control rearward movement of the inflated airbag member 236 (i.e. in addition to the movement control structure 38).

Third Embodiment

Referring now to FIGS. 9-12, a modified whiplash protection structure 314 in accordance with a third embodiment will now be explained. The whiplash protection structure 314 of this third embodiment is identical to the whiplash protection structure 14 of the first embodiment, except that the whiplash protection structure 314 includes a modified head restraint airbag 316 and a modified seat back 322. Otherwise, this embodiment is identical to the first embodiment. Accordingly, it will be apparent to those skilled in the art from this disclosure that the descriptions and illustrations of the first embodiment also apply to this third embodiment, except as explained and illustrated herein.

In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. The parts of the third embodiment that differ from the parts of the first embodiment, but are functionally identical will be given the same references numerals but with "300" added thereto (i.e. 300 series).

In this embodiment, the modified seat back 322 includes a main back support portion 323a and a headrest 323b mounted to the top of main back support portion 323a. The head restraint airbag 316 is mounted within the headrest 323b to be deployed upwardly out of the top thereof. The modified head restraint airbag 316 has a modified airbag member 336 with a modified shape (e.g. substantially oval). Preferably, the airbag member 336 deploys along a deployment path substantially identical to the first embodiment. The head restraint airbag 316 further includes the movement control structure 38 of the first embodiment. In this embodiment, headrest 323b can be provided merely for passenger comfort due to the presence of the head restraint airbag 316. In other words, the headrest 323b can be smaller and located differently than typically provided for whiplash protection due to the presence of the whiplash protection structure 316. Accordingly visibility and comfort of passengers can be optimized, while also providing whiplash protection.

As used herein to describe the above embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A whiplash protection structure for a vehicle comprising: a vehicle seat back configured to be mounted in a vehicle in a substantially upright position to support an occupant's back;
   an air bag arranged in the seat back to deploy from an uppermost end of the vehicle seat back along an upward deployment path to form a head restraint above the uppermost end of the seat back when inflated upwardly; and
   an air bag anti-rotation structure arranged between the airbag and a frame portion of the seat back in order to limit rearward movement of the airbag when inflated, the air bag anti-rotation structure including at least one connecting member coupled between a front side of the airbag and the frame portion of the seat back to limit rearward movement of the airbag when inflated.

2. The whiplash protection structure according to claim 1, wherein
   the seat back includes an airbag opening that is closed using a bursting seam that is broken during deployment of the airbag.

3. The whiplash protection structure according to claim 1, wherein
the airbag includes a plurality of airbag chambers that extend vertically when the airbag is deployed.

4. The whiplash protection structure according to claim 3, wherein
the airbag chambers are arranged in a laterally spaced side by side configuration in a non-overlapping manner when the airbag is inflated.

5. The whiplash protection structure according to claim 1, wherein
the connecting member includes a flexible strap.

6. The whiplash protection structure according to claim 1, wherein
the air bag anti-rotation structure includes an airbag support member that is configured and arranged to engage and support a bottom rear end of the airbag to limit rearward movement of the airbag when inflated.

7. The whiplash protection structure according to claim 1, wherein
the uppermost end of the seat back is absent a headrest coupled thereto.

8. The whiplash protection structure according to claim 7, wherein
the air bag is configured and arranged such that the deployment path of the air bag is inclined forwardly relative to a center plane of the seat back.

9. The whiplash protection structure according to claim 1, wherein
the seat back includes a back support portion with a headrest arranged at an upper end of the back support portion, and the airbag is arranged in the headrest.

10. The whiplash protection structure according to claim 9, wherein
the headrest is adjustably coupled to the back support portion.

* * * * *